G. LANDRINE.
Tea Kettle.
No. 100,045.  Patented Feb. 22, 1870.
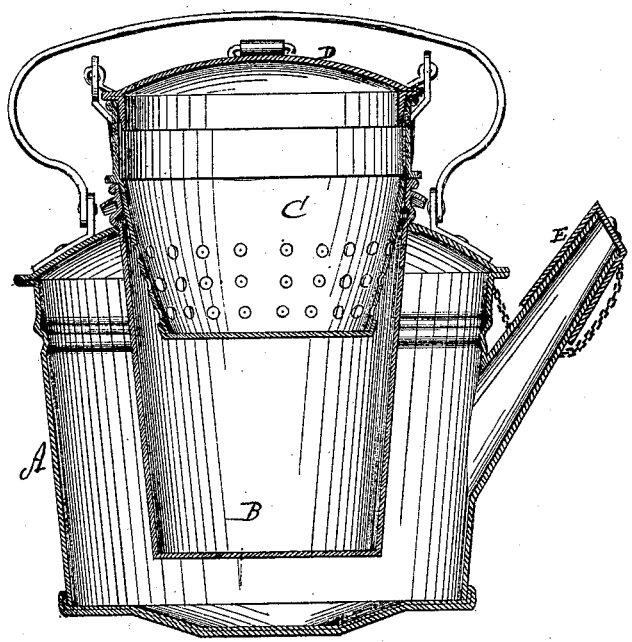

United States Patent Office.

G. LANDRINE, OF JERSEY CITY, NEW JERSEY.

Letters Patent No. 100,045, dated February 22, 1870.

CULINARY VESSEL.

The Schedule referred to in these Letters Patent and making part of the same.

*To all whom it may concern:*

Be it known that I, G. LANDRINE, of Jersey City, in the county of Hudson, and State of New Jersey, have invented a new and useful Improvement in Combination Tea-Kettles; and I do hereby declare that the following is a full, clear, and exact description thereof, which will enable others skilled in the art to make and use the same, reference being had to the accompanying drawing forming part of this specification.

This invention relates to a new and useful improvement in culinary utensils, and consists in combining with an ordinary tea-kettle a boiler and a steamer, arranged as hereinafter more fully described.

The accompanying drawing represents a vertical central section of the combination tea-kettle.

This article is more especially designed to accommodate small families and individuals who may be limited for room and desire to cook their own meals, but it is adapted to use in families generally, saving much space on the cooking-stove by enabling the cook to perform different operations by means of a single vessel.

A represents the tea-kettle, which may be made of either tin, copper, or cast-iron.

Into the kettle a boiler, B, and a steamer, C, are fitted.

D is a cover, which fits either the boiler or the steamer, and, while both articles fit the kettle, the steamer is made to fit into the boiler, as represented in the drawing.

The boiler B is designed for boiling puddings, but may be used for other purposes, as, for instance, for boiling meat or vegetables.

While meat or one kind of vegetable is cooking in the boiler, potatoes or any other kind of vegetables may be cooking in the steamer, and at the same time water for tea or coffee, or for any other purpose, may be boiling in the tea-kettle.

Either the boiler or the steamer may be used on the tea-kettle separate from each other, if desired.

E is a cap to place over the spout F of the tea-kettle for the purpose of preventing (to a certain extent) the escape of steam in that direction, and confining it sufficiently to force it upward and around the boiler, so that there may be a slight pressure in the kettle, and the water therein raised slightly above the boiling point.

The cap is tapering, but has sufficient friction with the spout to allow of the desired pressure before it will start off. A slight over-pressure will loosen it, when it acts as a safety-valve.

The advantages of this combination and arrangement are many, and must be obvious to all.

Having thus described my invention,

I claim as new and desire to secure by Letters Patent—

1. As a new and improved article of manufacture, a combination tea-kettle, formed of the parts A, B, and C, constructed, arranged, combined, and operating substantially as and for the purposes described.

2. In combination with the parts A, B, and C, the cap E, substantially as and for the purposes set forth.

G. LANDRINE.

Witnesses:
    FRANK BLOCKLEY,
    GEO. W. MABEE.